United States Patent [19]

Numata et al.

[11] Patent Number: 5,226,584
[45] Date of Patent: Jul. 13, 1993

[54] PARTS ASSEMBLING METHOD

[75] Inventors: Takumi Numata; Shunsuke Okamoto; Yasuhiro Seto; Shigenori Sakuda, all of Hiroshima, Japan

[73] Assignee: Kurata Corporation, Hiroshima, Japan

[21] Appl. No.: 966,828

[22] Filed: Oct. 27, 1992

[51] Int. Cl.⁵ .............................................. B23K 31/02
[52] U.S. Cl. ..................... 228/182; 228/176; 228/4.1; 29/430
[58] Field of Search ................ 228/182, 176, 102, 4.1, 228/6.1, DIG. 1; 29/429, 430, 783, 787, 791, 794, 822

[56] References Cited

U.S. PATENT DOCUMENTS

| | | | |
|---|---|---|---|
| 4,535,927 | 8/1985 | Matsubara et al. | 228/DIG. 1 |
| 4,611,749 | 9/1986 | Kawano | 228/176 |
| 4,678,110 | 7/1987 | Handa | 228/4.1 |
| 4,744,500 | 5/1988 | Hatakeyama et al. | 228/DIG. 1 |
| 4,988,032 | 1/1991 | Sakaguchi et al. | 228/182 |
| 5,079,822 | 1/1992 | Arai et al. | 29/430 |

Primary Examiner—Richard K. Seidel
Assistant Examiner—Chuck Y. Mah
Attorney, Agent, or Firm—Sixbey, Friedman, Leedom & Ferguson

[57] ABSTRACT

In a first station, a first part is set to a work at a predetermined position thereof, and the work is then conveyed to a second station by a first jig truck, and the first jig truck which has finished such a conveyance, is then returned back to the first station from the second station. In the second station, the first part is spot-welded to the work, and the work thus spot-welded is conveyed to a third station by a second jig truck. In the third station, a second part is set to a predetermined position of the work with which the first part has been assembled, and the work is then conveyed to a fourth station by the second jig truck. In the fourth station, the second part is spot-welded to the work, and the second jig truck which has conveyed the work to the fourth station, is returned back to the second station from the fourth station through the third station.

2 Claims, 12 Drawing Sheets

PARTS ASSEMBLING METHOD

BACKGROUND OF THE INVENTION

The present invention relates to improvements in a parts assembling method by which parts are successively set to a work and then assembled therewith.

Figure 4:
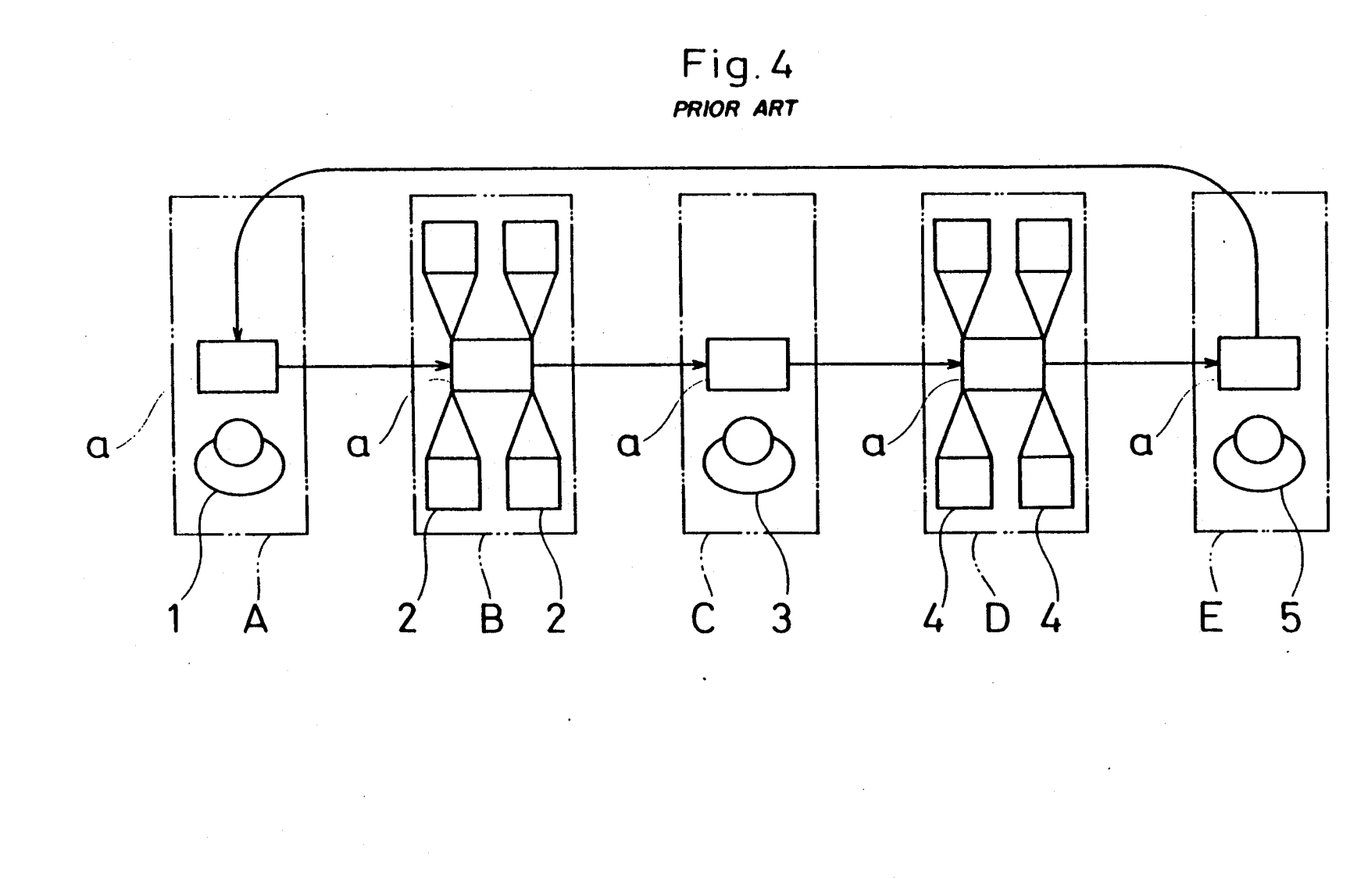
FIG. 4 is a general schematic view illustrating the arrangement of a conventional parts assembling line.

As a parts assembling method of the type above-mentioned, there is known a method as shown in FIG. 4. More specifically, a worker 1 sets a first part to a work at a predetermined position thereof in a first station A, and the first part is then welded to the work by welding robots 2 in a second station B, so that the first part is assembled with the work. In a third station C, a worker 3 sets a second part to a predetermined position of the work with which the first part has been assembled, and the second part is welded to the work by welding robots 4 in a fourth station D, so that the second part is assembled with the work. In a fifth station E, a worker 5 assembles, with bolts, a third part to the work with which the second part has been assembled.

In the parts assembling method above-mentioned, while a variety of operations are carried out on a work placed on a jig truck a, the work as placed on the jig truck a is successively conveyed from the first station A to the second station B, from the second station B to the third station C, from the third station C to the fourth station D, and from the fourth station D to the fifth station E.

Accordingly, the jig truck a has (i) means for setting a first part to a work at a predetermined position thereof, (ii) means for holding the work with which the first part has been assembled, (iii) means for setting a second part to the work with which the first part has been assembled, and (iv) means for holding the work with which the second part has been assembled.

In the conventional method above-mentioned, in order that a variety of operations are concurrently carried out at all times in the first to fifth stations to make the most efficient use of the working facilities and workers, it is required to dispose five jig trucks a, as shown in FIG. 4, each of which has the holding means and setting means as above-mentioned.

Further, there are cases where the holding means and setting means above-mentioned get in the way of the operations of industrial robots or the like.

As discussed in the foregoing, the conventional parts assembling method disadvantageously presents an increase in the cost of a parts assembling line because a number of jig truck a are required and each jig truck a has different types of means. Particularly, to cope with such recent requirements as to produce small amounts of a number of different types of articles, it is inevitable that a parts assembling line is considerably increased in cost.

Further, the holding means of the same type and the setting means of the same type disposed at the jig trucks a inevitably vary in precision, resulting in variations in the precision of final products obtained.

SUMMARY OF THE INVENTION

In view of the foregoing, the present invention is proposed with the object of reducing the cost of a parts assembling line for producing small amounts of a number of different types of articles, as well as improving final products in precision.

To achieve the object above-mentioned, the present invention employs a system where first delivery means conveys a work between a first station and a second station, and second delivery means conveys the work among the second station, a third station and a fourth station, instead of a system where common delivery means is successively circulated among the respective stations.

More specifically, the parts assembling method of the present invention comprises a first step for setting a predetermined part to a work at a predetermined position thereof in a first station, a second step for conveying the work for which the first step has been finished, from the first station to a second station, a third step for conducting a first assembling operation on the work in the second station, a fourth station for conveying the work for which the third step has been finished, from the second station to a third station, a fifth step for conducting a predetermined operation such as setting a part on the work in the third station, a sixth step for conveying the work for which the fifth step has been finished, from the third station to a fourth station, and a seventh step for conducting a second assembling operation on the work in the fourth station. In the parts assembling method of the present invention, the second step is carried out by first delivery means movable between the first station and the second station, the fourth and sixth steps are carried out by second delivery means movable among the second station, the third station and the fourth station. The method of the present invention further comprises an eighth step for returning, from the second station to the first station, the first delivery means which has finished the conveyance of the work from the first station to the second station at the second step, and a ninth step for returning, from the fourth station to the second station through the third station, the second delivery means which has finished the conveyance of the work from the third station to the fourth station at the sixth step.

According to the parts assembling method having the arrangement above-mentioned, the first delivery means is movable between the first station and the second station, and the second delivery means is movable among the second station, the third station and the fourth station. It is therefore enough that the first delivery means has means for holding a work to which a part has been set, and that the second delivery means has (i) means for holding a work for which the first assembling operation has been finished in the second station, (ii) means required for conducting a predetermined operation in the third station and (iii) means for holding a work for which the second assembling operation has been finished in the third station. More specifically, it is enough that each delivery means has the minimum of setting means or holding means required.

As the delivery means, it is sufficient to dispose three delivery means comprising the first and second delivery means above-mentioned, and third delivery means for conveying a work from the fourth station to the outside of the line.

As compared with the conventional parts assembling method which requires five or more delivery means, the parts assembling method of the present invention is reduced in the number of delivery means required. Further, each delivery means in the present invention is not required to have a number of setting means or holding means necessary in all the stations, as required in the conventional parts assembling method.

Further, the method of the present invention does not require truck collecting facilities and places, as required in the conventional parts assembling method.

Further, the method of the present invention can be applied for productions of small amounts of a number of different types of articles by merely changing jigs of the delivery means, and is therefore reduced in investment cost at the time of replacement of jigs.

According to the conventional parts assembling method, it is required to enhance the precision of the setting means or the holding means of the delivery means, but such high precision can be maintained with difficulty. On the other hand, in the parts assembling method of the present invention, each delivery means is merely required to have setting means or holding means necessary for the corresponding stations. It is therefore easier to improve in precision the setting means or holding means disposed at each delivery means. This results in improvement in the precision of products produced by the method of the present invention.

DETAILED DESCRIPTION OF THE INVENTION

The following description will discuss preferred embodiments of the present invention with reference to the attached drawings.

Figure 1:
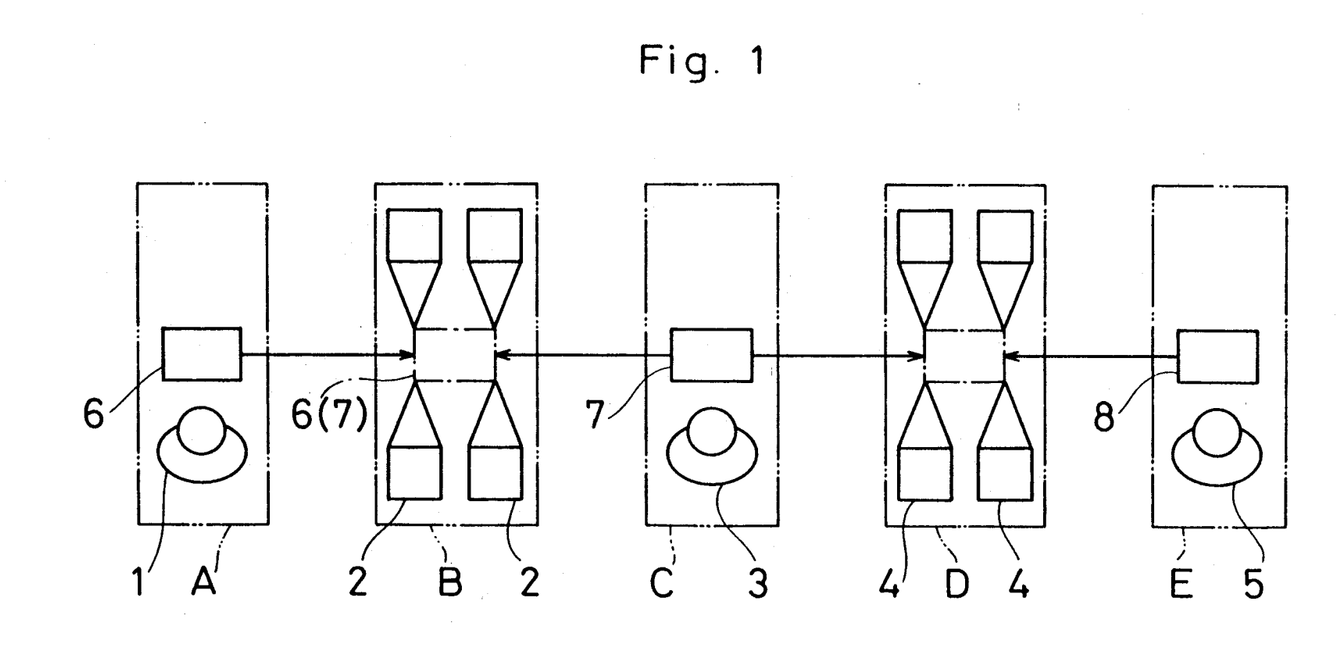
FIG. 1 is a general schematic view illustrating the arrangement of a parts assembling line used in the practice of a first embodiment of the present invention.

FIG. 1 is a general schematic view illustrating the arrangement of a parts assembling line used in the practice of a first embodiment of the present invention. In a first station A, a worker 1 sets a first part to a work at a predetermined position thereof. In a second station B, the first part set to the work in the first station A, is spot-welded to the work by welding robots 2, so that the first part is assembled with the work. Disposed in the second station B is first holding means for holding the work with which the first part has been assembled. In a third station C, a worker 3 sets a second part to a predetermined position of the work with which the first part has been assembled. In a fourth station D, the second part set to the work in the third station C, is spot-welded to the work by welding robots 4, so that the second part is assembled with the work. Disposed in the fourth station D is second holding means for holding the work with which the second part has been assembled. In a fifth station E, a worker 5 assembles, with bolts, a third part with the work with which the second part has been assembled.

In FIG. 1, a first jig truck 6 serves as first delivery means having jig means for setting a first part to a work at a predetermined position thereof. The first jig truck 6 is movable between the first station A and the second station B. A second jig truck 7 serves as second delivery means having (i) work holding means for holding a work with which a first part has been assembled, and (ii) jig means for setting a second part to the work with which the first part has been assembled. The second jig truck 7 is movable among the second station B, the third station C and the fourth station D. A third jig truck 8 serves as third delivery means having work holding means for holding the work with which the second part has been assembled. The third jig truck 8 is movable between the fourth station D and the fifth station E.

The following description will discuss a parts assembling method in the parts assembling line above-mentioned as a first embodiment of the present invention.

With a work previously placed on the first jig truck 6, the worker 1 sets a first part to the work at a predetermined position thereof in the first station A. Then, the work having the first part set thereto is conveyed to the second station B by the first jig truck 6.

In the second station B, the first part set to the work in the first station A is spot-welded to the work by the welding robots 2, so that the first part is assembled with the work. Then, the work on the first jig truck 6 is held by the first holding means. The first jig truck 6 which is now empty, is moved to the first station A for the next operation therein.

The second jig truck 7 located in the third station C is then moved, as having no load, to the second station B. The work with which the first part has been assembled, is placed on the second jig truck 7, which is then moved to the third station C.

In the third station C, a second part is set to a predetermined position of the work placed on the second jig truck 7. The work to which the second part has been set, is conveyed, as placed on the second jig truck 7, to the fourth station D.

In the fourth station D, the second part set to the work in the third station C is spot-welded to the work by the welding robots 4, so that the second part is assembled with the work. Then, the work on the second jig truck 7 is held by the second holding means. The second jig truck 7 which is now empty, passes through the third station C without stopping there and is moved to the second station B for the next operation therein.

The third jig truck 8 located in the fifth station E is moved, as having no load, to the fourth station D, where the work having the second part assembled therewith, is placed on the third jig truck 8. The third jig truck 8 on which the work has been placed, is moved to the fifth station E. In the fifth station E, a worker 5 assembles, with bolts, a third part with the work with which the second part has been assembled.

FIGS. 2 (a) to (e) and FIGS. 3 (a) to (e) show a line for assembling the bodies of motor vehicles as second and third embodiments of the parts assembling method of the present invention. FIGS. 2 (a) to (e) show the arrangement of the line in side elevation, while FIGS. 3 (a) to (e) show the arrangement of the line in front elevation. In each of FIGS. 2 and 3, (b), (c), (d) and (e) are subsequent to and downstream of (a), (b), (c) and (d), respectively.

As shown in FIG. 2 (a) and FIG. 3 (a), a worker 10a places a left side frame inner 10b on a truck 10d and a side frame outer 10c on a truck 10e in a first-part setting station 10, and both trucks 10d, 10e are moved to a first spot-welding station 12.

Figure 2A:
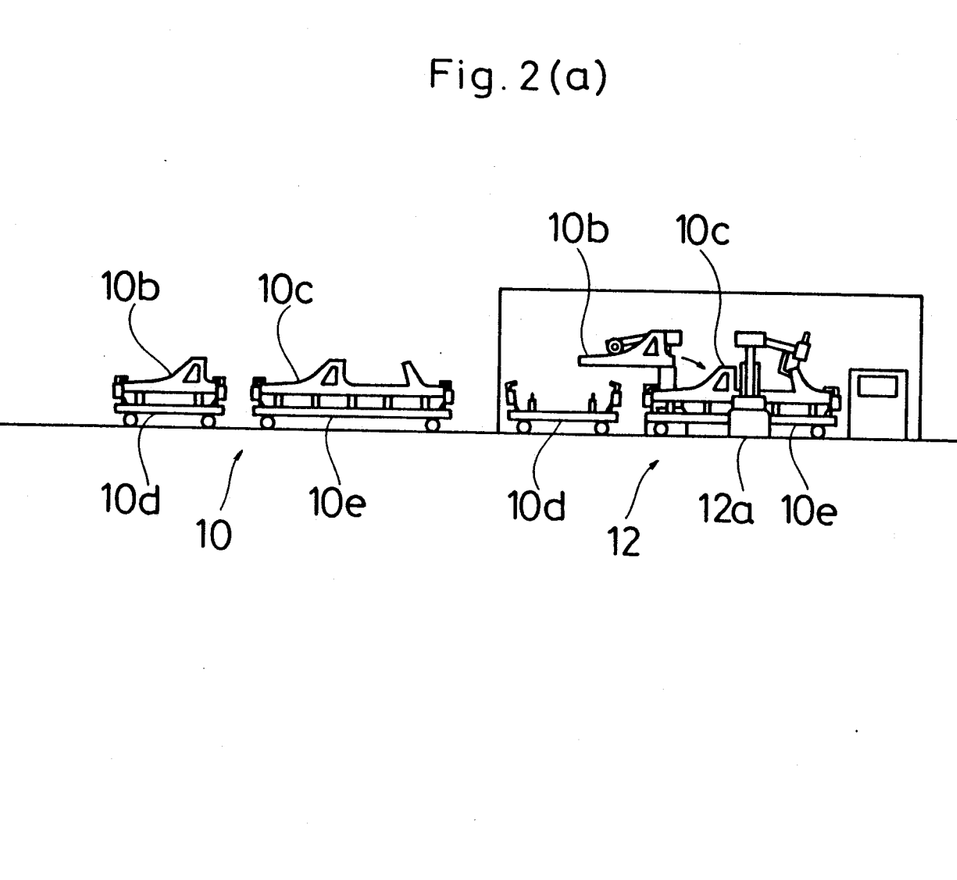
FIGS. 2(a)-2(e) are side views of a parts assembling line used in the practice of second and third embodiments of the present invention.
Figure 3A:
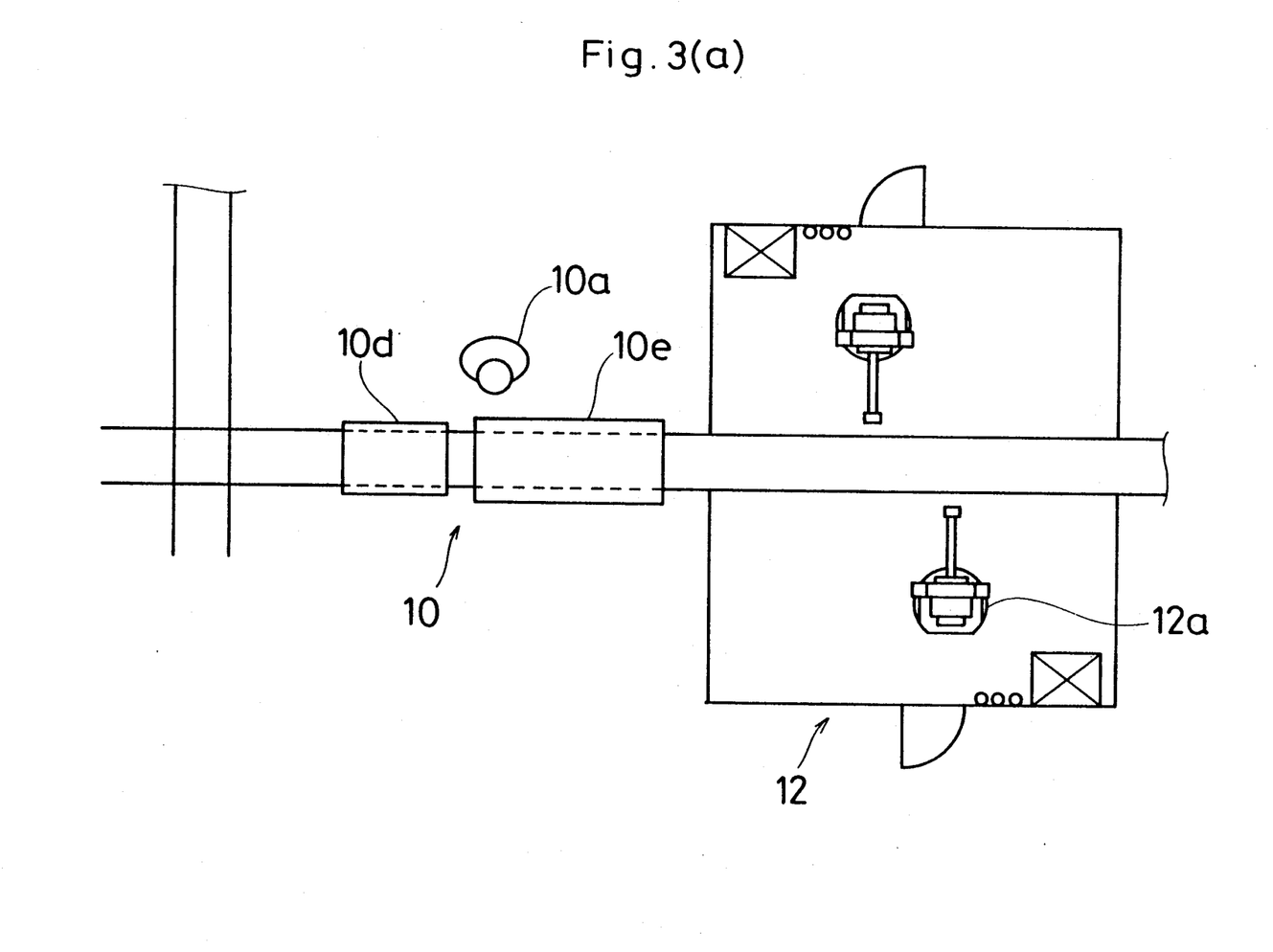
FIGS. 3(a)-3(e) are plan views of a parts assembling line used in the practice of second and third embodiments of the present invention.

In the first spot-welding station 12, the left side frame inner 10b is set and then spot-welded to the side frame outer 10c by welding robots 12a, so that the left side frame inner 10b is assembled with the side frame outer 10c.

In a second-part setting station 14 shown in FIG. 2 (b) and FIG. 3 (b), a worker 14a places a right side frame inner 14b on a truck 14c. Then, the truck 14c is moved to the first spot-welding station 12, where likewise the left side frame inner 10b, the right side frame inner 14b is assembled with the side frame outer 10c. A side frame 14d with which the right side frame inner 14b has been assembled is conveyed, as placed on the truck 10e, to the second-part setting station 14. The side frame 14d is carried outside of the second-part setting station 14 by a lift 14e. In a station (not shown), a roof (not shown) is assembled with the side frame 14d.

Figure 2B:
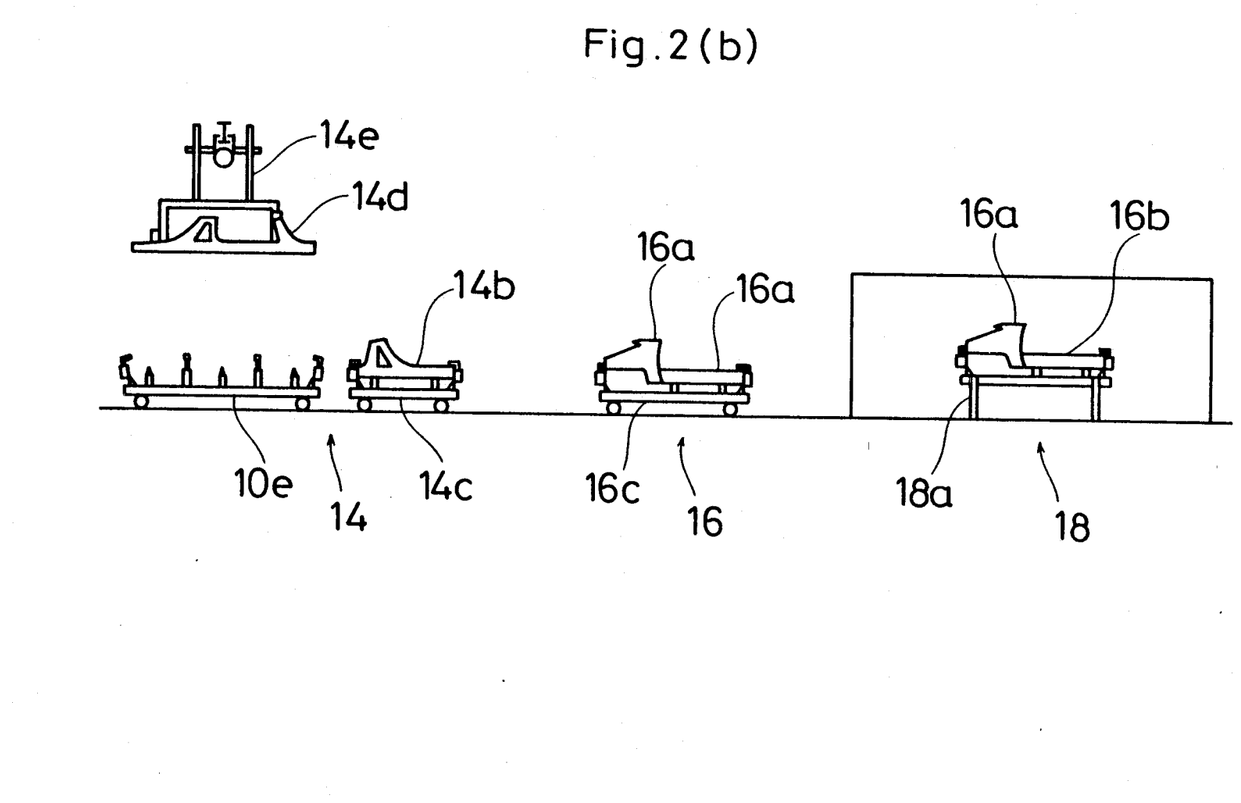
Figure 3B:
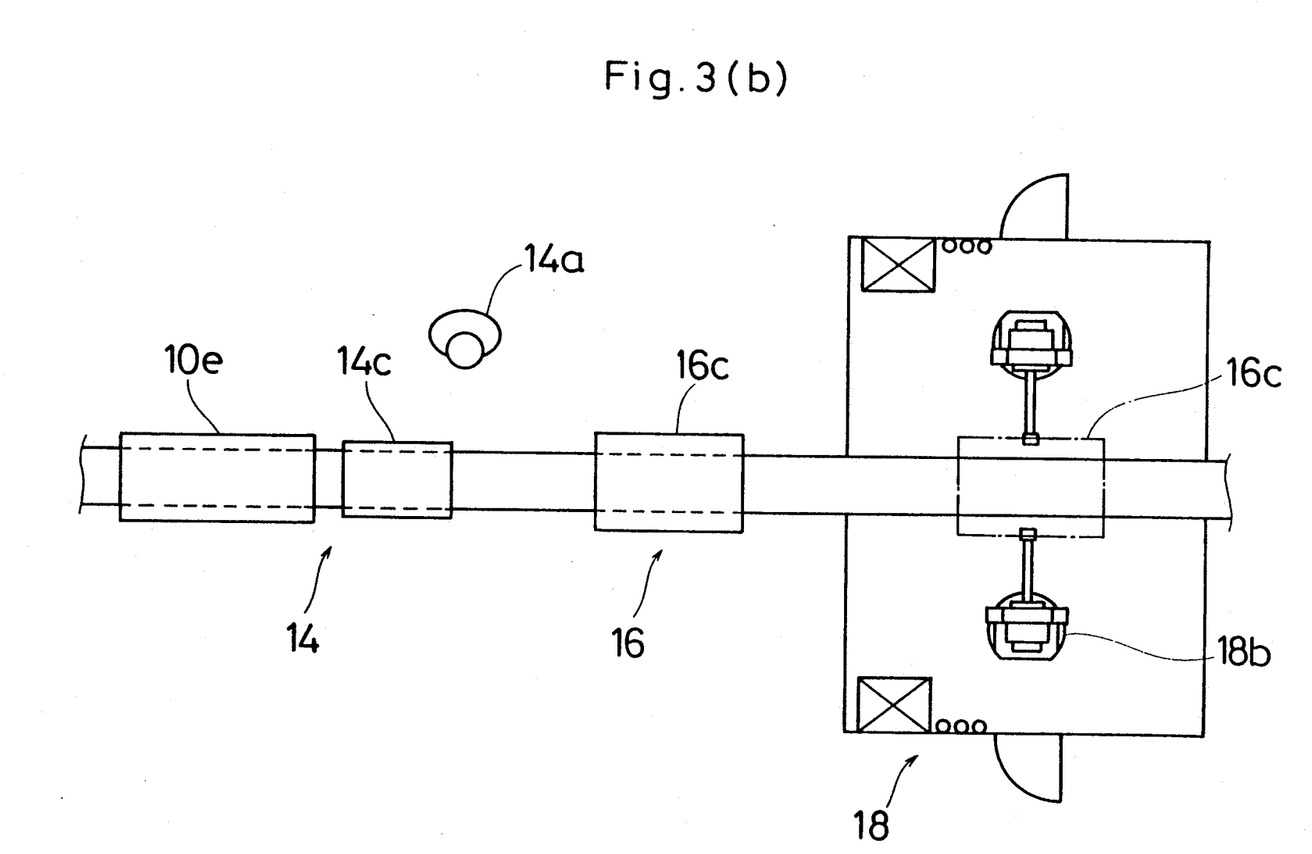

Assembling the side frame 14d is finished by the operations carried out in the first-part setting station 10, the first spot-welding station 12 and the second-part setting station 14 above-mentioned.

In a third-part setting station 16, a worker 14a sets a front body 16a to a front floor 16b on a truck 16c. The front body 16a and the front floor 16b are conveyed, as placed on the truck 16c, to a second spot-welding station 18.

In the second spot-welding station 18, the front body 16a and the front floor 16b on the truck 16c are spot-welded to each other by welding robots 18b, so that the front body 16a is assembled with the front floor 16b. Then, the front body 16a assembled with the front floor 16b is held by first holding means 18a.

A truck 20a located in a fourth-part setting station 20 shown in FIG. 2 (c) and FIG. 3 (c) is moved, as having no load, to the second spot-welding station 18. The front body 16a assembled with the front floor 16b placed on the first holding means 18a is transferred to the truck 20a, which is then conveyed to the fourth-part setting station 20. In the fourth-part setting station 20, a worker 20b sets a rear floor 20c to the front body 16a and the front floor 16b as placed on the truck 20a. The front body 16a, the front floor 16b and the rear floor 20c are conveyed to a third spot-welding station 22 by the truck 20a.

Figure 2C:
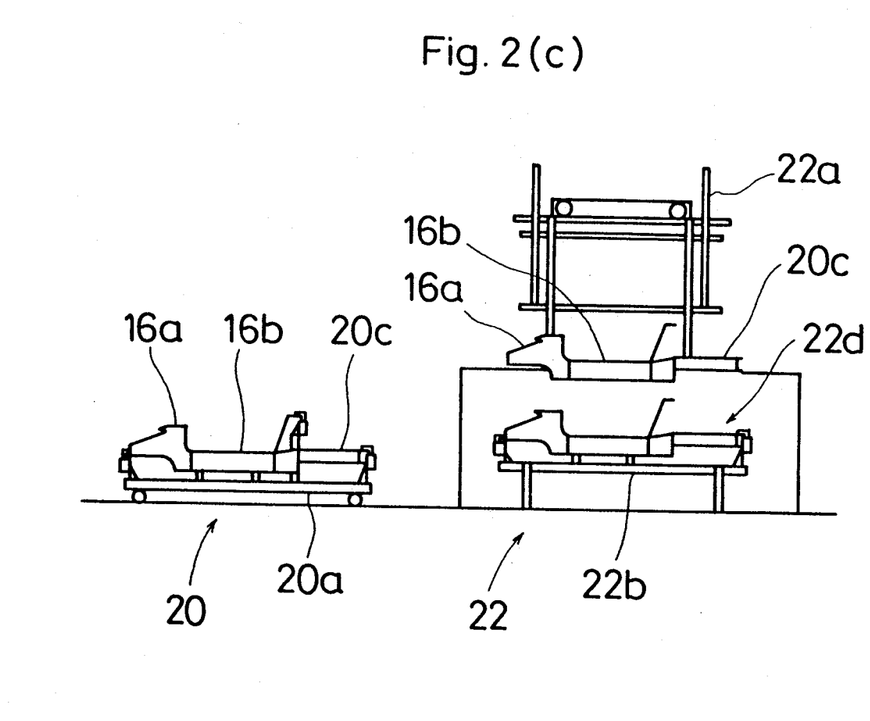
Figure 3C:
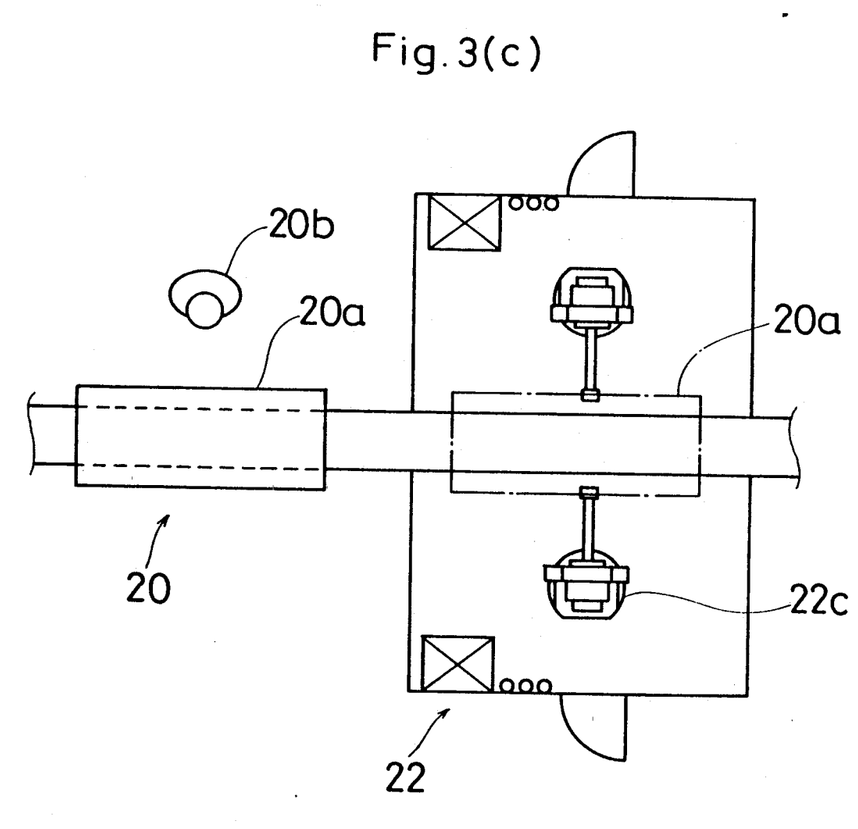

In the third spot-welding station 22, the front body 16a and the front floor 16b to which the rear floor 20c has been set, are transferred from the truck 20a to second holding means 22b by a lift 22a, and then spot-welded by welding robots 22c, thus assembling an under-body 22d.

Assembling the under-body 22d is completed by the operations carried out in the third-part setting station 16, the second spot-welding station 18, the fourth-part setting station 20 and the third spot-welding station 22.

Then, a truck 24a located in a fifth-part setting station 24 shown in FIG. 2 (d) and FIG. 3 (d) is moved, as having no load, to the third spot-welding station 22.

Figure 2D:
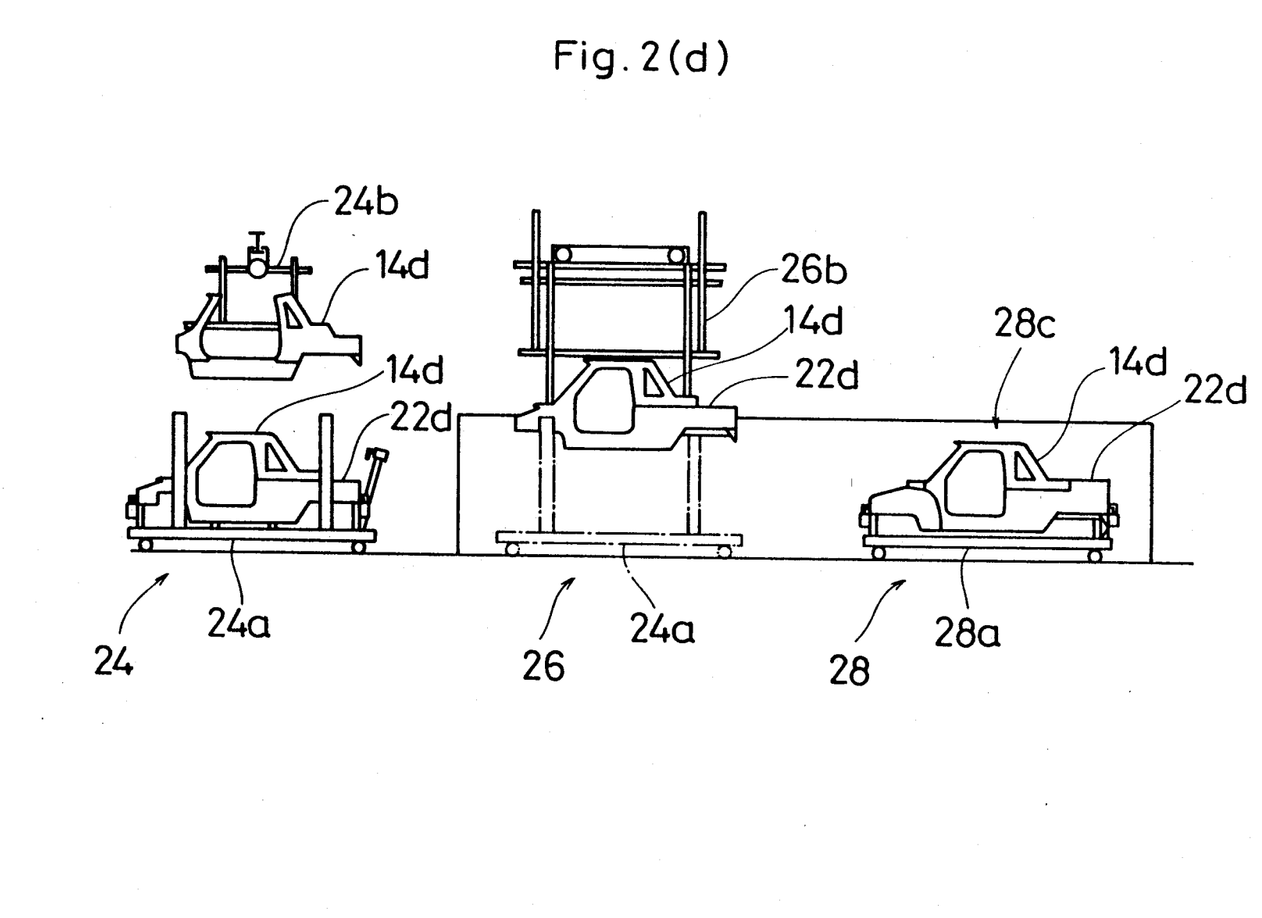
Figure 3D:
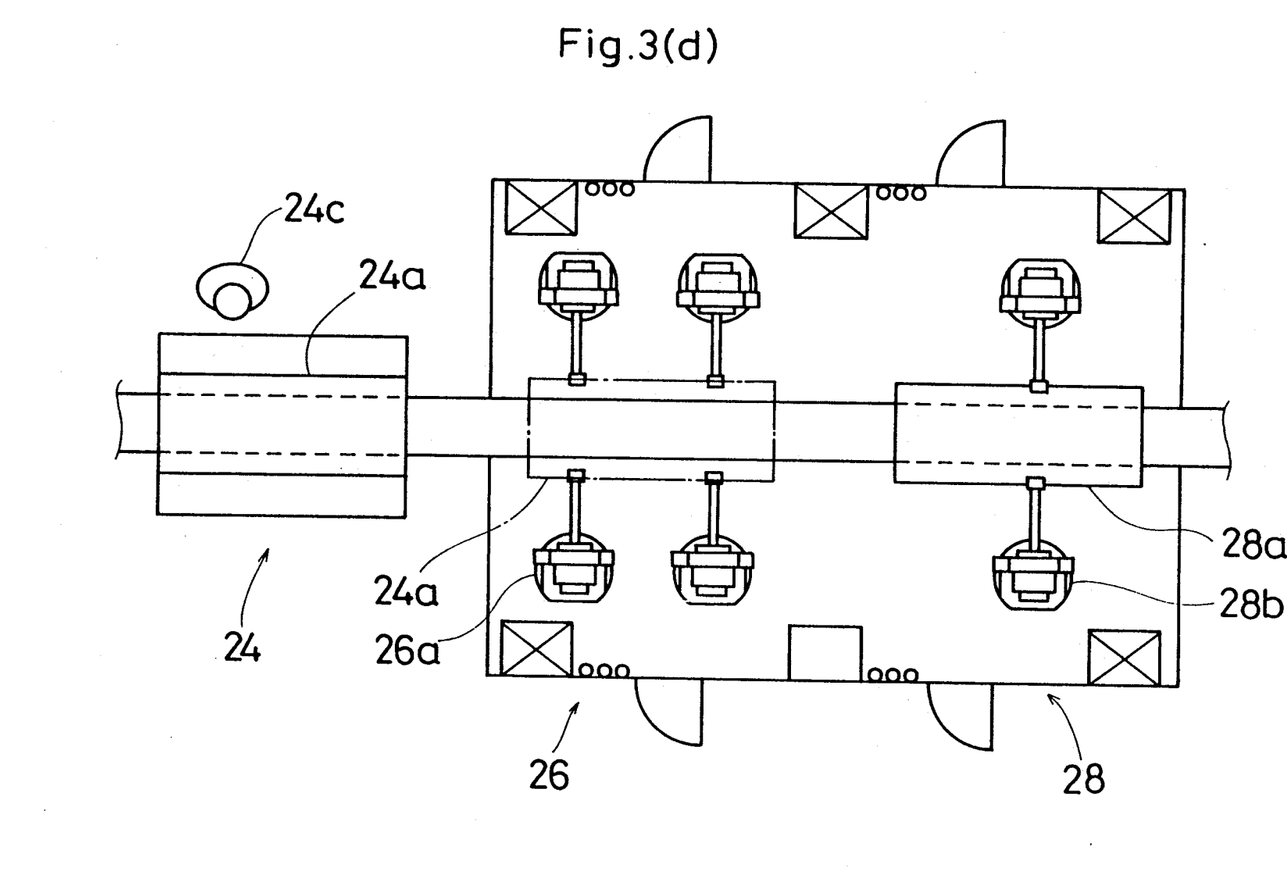

In the third spot-welding station 22, the under-body 22d thus assembled which is placed on the second holding means 22b, is transferred to the truck 24a, which is then moved again to the fifth-part setting station 24. The side body 14d carried by a lift 24b is placed on the under-body 22d on the truck 24a, and a worker 24c then sets the side body 14d to the under-body 22d. Then, the under-body 22d to which the side body 14d has been set, is conveyed, as placed on the truck 24a, to a fourth spot-welding station 26.

In the fourth spot-welding station 26, the under-body 22d and the side body 14d on the truck 24a are spot-welded to each other by welding robots 26a, so that the side body 14d is assembled with the under-body 22d. The side body 14d thus assembled with the under-body 22d is lifted up by a lift 26b, and the truck 24a which is now empty, is moved to the fifth-part setting station 24.

A truck 28a located in a MIG brazing station 28 is moved, as having no load, to the fourth spot-welding station 26, where the side body 14d and the under-body 22d lifted up by the lift 26a are then transferred to the truck 28a. The truck 28a is moved back to the MIG brazing station 28, where arc welding is carried out on the entire periphery of a body 28c placed on the truck 28a.

As shown in FIG. 2 (e) and FIG. 3 (e), the body 28c as placed on the truck 28a is conveyed from the MIG brazing station 28 to a bolt-up station 30, where the body 28c is transferred to third holding means 30a. Then, a worker 30b assembles, with bolts, doors 30c with the body 28c to form a complete vehicle 30d. Then, the complete vehicle 30d is checked for the respective portions for which operations have been conducted.

Figure 2E:
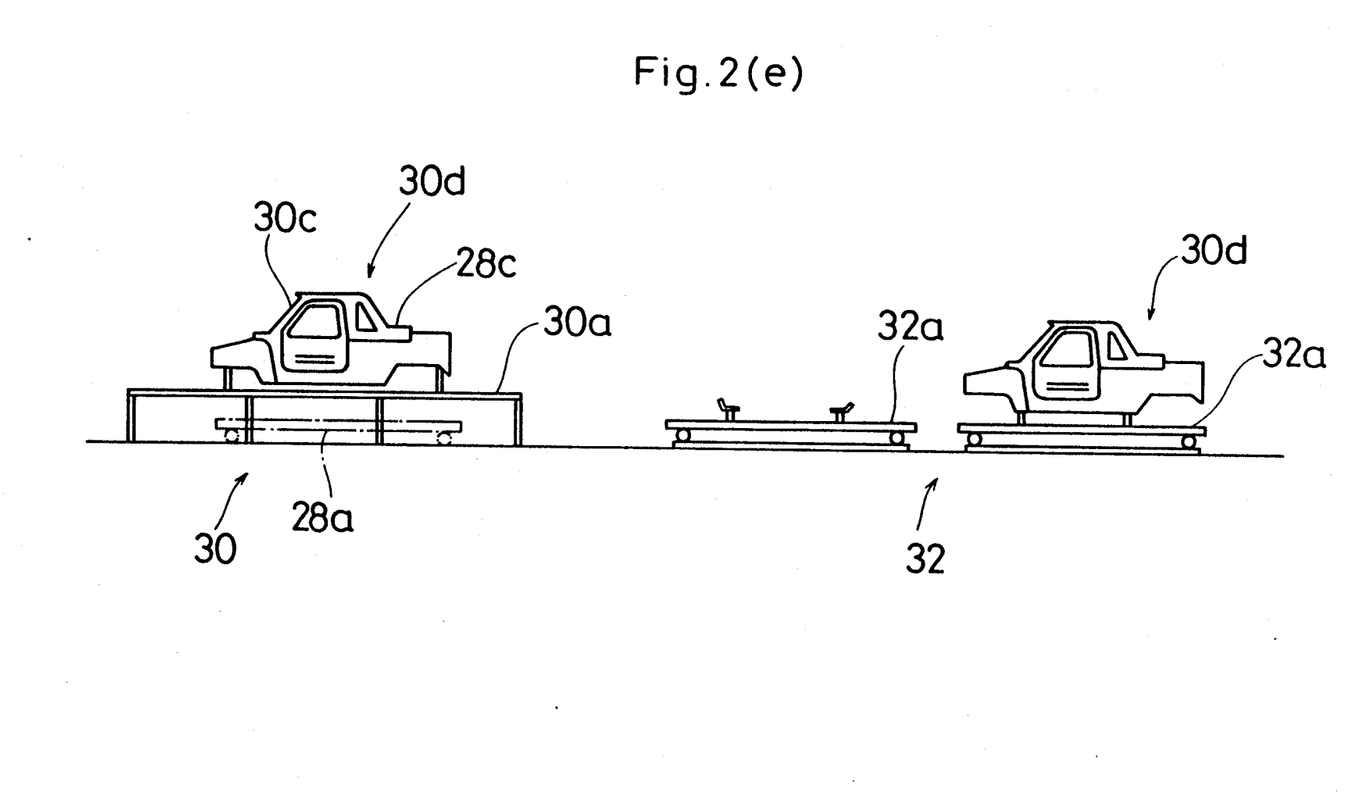
Figure 3E:
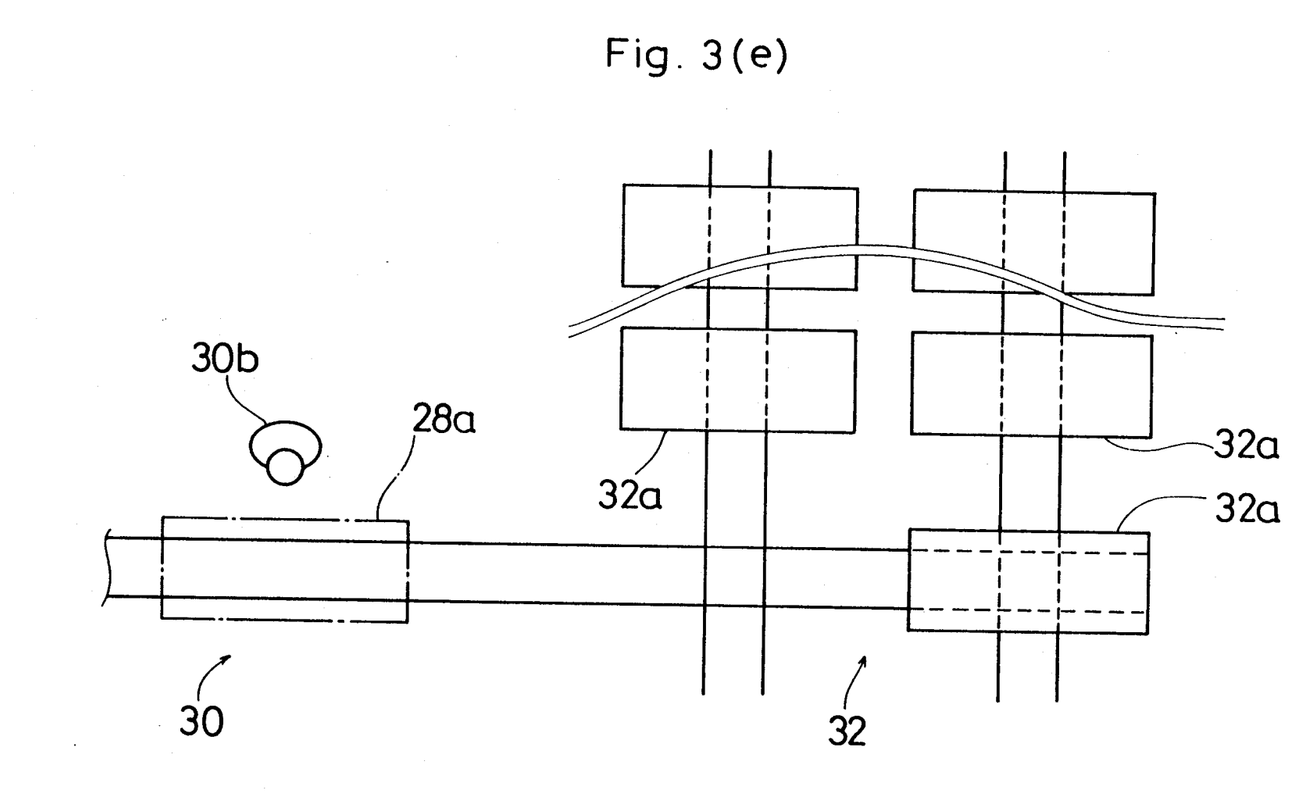

A truck 32a located in a complete vehicle buffer station 32 is moved, as having no load, to the bolt-up station 30. In the bolt-up station 30, the complete vehicle 30d of which checking has been finished, is transferred to the truck 32a. The complete vehicle 30d as placed on the truck 32a is conveyed to the complete vehicle buffer station 32.

In the second embodiment of the present invention, the third-part setting station 16 forms the first station, the second spot-welding station 18 formes the second station, the fourth-part setting station 20 formes the third station, the third spot-welding station 22 forms the fourth station, the truck 16c forms the first delivery means, the truck 20a forms the second delivery means and the truck 24a forms the third delivery means.

In the third embodiment of the present invention, the fourth-part setting station 20 forms the first station, the third spot-welding station 22 forms the second station, the fifth-part setting station 24 26 forms the fourth station, the truck 20a forms the first delivery means, the truck 24a forms the second delivery means and the truck 28c forms the third delivery means.

What is claimed is:

1. A parts assembling method comprising a first step for setting a predetermined part to a work at a predetermined position thereof in a first station, a second step for conveying said work for which said first step has been finished, from said first station to a second station, a third step for conducting a first assembling operation on said work in said second station, a fourth step for conveying said work for which said third step has been finished, from said second station to a third station, a fifth step for conducting a predetermined operation such as setting a part on said work in said third station, a sixth step for conveying said work for which said fifth step has been finished, from said third station to a fourth station and a seventh step for conducting a second assembling operation on said work in said fourth station, said second step being carried out by first delivery means movable between said first station and said second station, said fourth and sixth steps being carried out by second delivery means movable between said second station, said method further comprising an eighth step for returning, from said second station to said first station, said first delivery means which has finished the conveyance of said work from said first station to said second station at said second step, and a ninth step for returning, from said fourth station to said second station after passing through said third station, said second delivery means which has finished the conveyance of said work from said third station to said fourth station at said sixth step.

2. A parts assembling method according to claim 1, wherein;

the first station is a place where a worker sets a first part to a work at a predetermined position thereof;

the second station is a place where said first part set to said work in said first station, is spot-welded by a welding robot, so that said first part is assembled with said work;

the third station is a place where a worker sets a second part to a predetermined position of said work with which said first part has been assembled; and the fourth station is a place where said second part set to said work in said third station, is spot-welded to said work by a welding robot, so that said second part is assembled with said work.

* * * * *